Patented Nov. 10, 1931

1,831,715

UNITED STATES PATENT OFFICE

BERTRAM MAYER AND HUGO SIEBENBÜRGER, OF BASEL, SWITZERLAND, ASSIGNORS TO SOCIETY OF CHEMICAL INDUSTRY IN BASLE, OF BASEL, SWITZERLAND

VAT DYESTUFFS AND PROCESS OF MAKING SAME

No Drawing. Application filed July 18, 1928, Serial No. 293,783, and in Switzerland July 21, 1927.

The present invention relates to vat dyestuffs valuable for the production of fast tints on the fibre.

In the U. S. Patent application, Serial No. 150,371, filed November 23rd, 1926, there has been disclosed the production of dyestuffs dyeing cotton navy blue shades fast to water by chlorinating dibenzanthrone at raised temperatures with chlorine in presence of liquids which are not miscible with water.

It has now been found that it is also possible to arrive at such products which dye cotton blue shades fast to water by treating compounds of the general formula

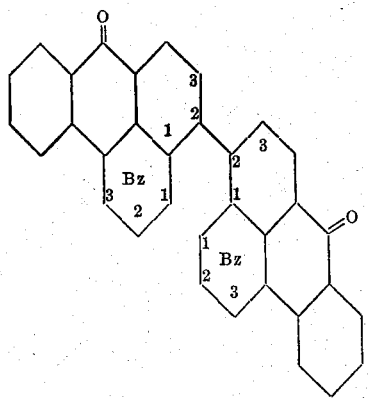

wherein the two carbon atoms in position 1 of the two Bz rings carry a hydrogen atom or may be linked to each other, with so much ferric chloride that the vat dyestuffs so produced do no longer dye cottom a violet which is not fast to water, but which is blue and fast to water. For this purpose at least 5 parts of ferric chloride are necessary. The position of the chlorine atom in the products so produced is not known.

The products thus obtained form dark powders, dissolving in concentrated sulfuric acid to a violet solution, yielding on cotton pure navy blue shades fast to water.

The following examples illustrate the invention:—

*Example 1*

10 parts by weight of pure dibenzanthrone of the formula

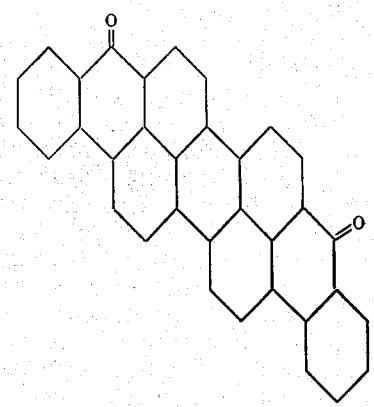

are suspended in 250 parts of trichlorobenzene. The suspension is heated, while stirring, to 140° C., and there are added slowly 60 parts of anhydrous ferric chloride. The whole is kept at a temperature of 140–150 C. for some hours. The chlorination proceeds with strong evolution of hydrochloric acid gas, the mass is treated with steam to expel trichlorobenzene and the residual dyestuff is extracted by means of dilute hydrochloric acid, filtered and dried. There is obtained in good yield a dark blue powder, which is a dyestuff dyeing cotton in a vat tints which are blue and not sensitive to water.

The product dissolves to a violet-blue solution in concentrated sulfuric acid and is precipitated in the form of blue flocks when this solution is poured into water. In boiling nitrobenzene and trichlorobenzene it dissolves to a violet-blue solution having an intensely brown-red fluorescence. In boiling aniline it dissolves to a violet-blue solution. The vat is greenish-blue.

Example 2

10 parts by weight of pure 2:2′-dibenzanthronyl of the formula:

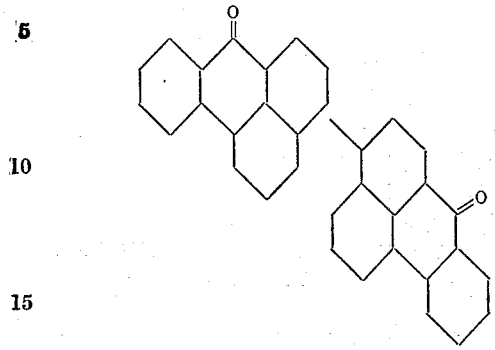

are suspended in a closed iron vessel provided with an agitator in 340 parts of trichlorobenzene. The suspension is heated, while stirring, to 140° C., and there are added slowly in small portions 60 parts of molten anhydrous ferric chloride. The whole is kept at a temperature of 140–150° C. for some hours. The formation of the dyestuff and the halogenation soon start, first with strong but later with relaxing evolution of hydrochloric acid gas. After cooling the contents of the reaction vessel is treated with steam until all trichlorobenzene has been expelled. Then the residual dyestuff is repeatedly extracted by means of warm dilute hydrochloric acid in order to remove completely all iron, washed free of acid, and dried. There is thus obtained in a good yield a dark blue dyestuff powder containing much halogen which is dyeing the fibre from a green-blue vat pure blue shades fast to water and to chlorine. In concentrated sulfuric acid it dissolves to a bluish-violet solution from which, when poured into water, blue flocks separate. In boiling nitrobenzene and trichlorobenzene it dissolves to a blue-violet solution having an intensively red fluorescence, and in boiling aniline to a reddish-blue solution.

What we claim is:—

1. Process for the manufacture of vat dyestuffs, consisting in treating compounds of the general formula

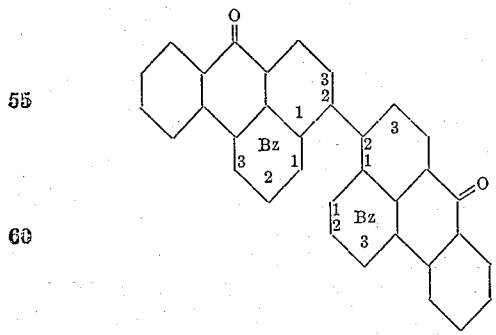

wherein the two carbon atoms in position 1 of the two Bz rings carry a hydrogen atom or may be linked to each other, in the presence of trichlorobenzene, with at least 5 parts by weight of ferric chloride to 1 part by weight of parent material.

2. Process for the manufacture of vat dyestuffs, consisting in treating the 2:2′-dibenzanthronyl of the formula

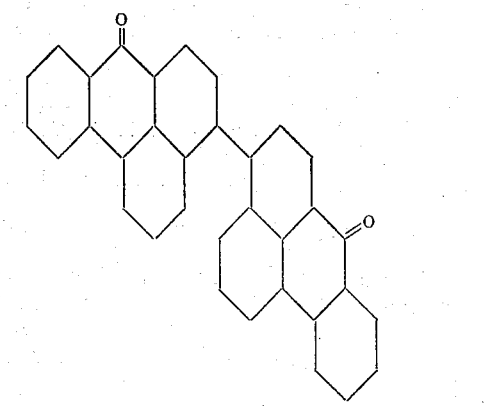

in the presence of trichlorobenzene, with at least 5 parts by weight of ferric chloride to 1 part by weight of 2:2′-dibenzanthronyl.

3. As new products of manufacture the vat dyestuffs of the dibenzanthrone series which are obtained by treating compounds of the general formula

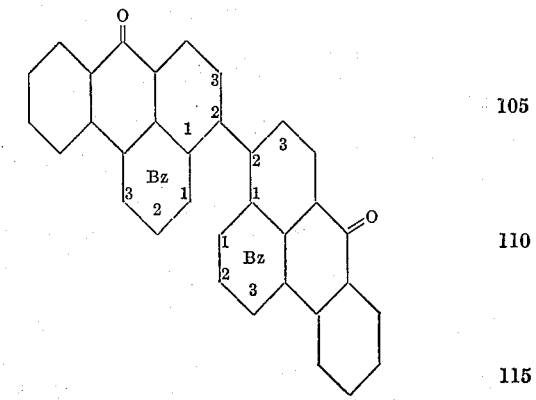

wherein the two carbon atoms in position 1 of the two Bz rings carry a hydrogen atom or may be linked to each other, in the presence of trichlorobenzene with at least 5 parts by weight of ferric chloride to 1 part by weight of parent material, but which is blue and fast to water, which products form dark powders, dissolving in concentrated sulfuric acid to a violet solution, yielding on cotton pure navy blue shades fast to water.

4. As new products of manufacture the vat dyestuffs of the dibenzanthrone series which are obtained by treating the 2:2'-dibenzanthronyl of the formula

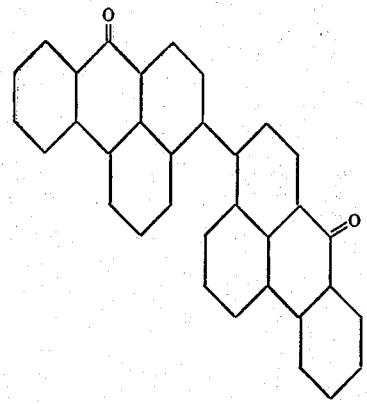

in the presence of trichlorobenzene with at least 5 parts by weight of ferric chloride to 1 part by weight of parent material, but which is blue and fast to water, which products form dark powders, dissolving in concentrated sulfuric acid to a violet solution, yielding on cotton pure navy blue shades fast to water.

In witness whereof we have hereunto signed our names this 7th day of July, 1928.

BERTRAM MAYER.
HUGO SIEBENBÜRGER.